(12) United States Patent
Begeja

(10) Patent No.: US 6,175,621 B1
(45) Date of Patent: Jan. 16, 2001

(54) PRIORITY CALL ON BUSY

(75) Inventor: Lee Begeja, Gillette, NJ (US)

(73) Assignee: AT&T Corp., New York, NY (US)

( * ) Notice: Under 35 U.S.C. 154(b), the term of this patent shall be extended for 0 days.

(21) Appl. No.: 08/964,272

(22) Filed: Nov. 4, 1997

(51) Int. Cl.[7] .......................... H04M 3/42; H04M 3/523; H04M 7/00; H04Q 3/64
(52) U.S. Cl. .......................... 379/207; 379/229; 379/266
(58) Field of Search .................................. 379/201, 207, 379/229, 230, 265, 266

(56) References Cited

U.S. PATENT DOCUMENTS

| | | | |
|---|---|---|---|
| 4,885,780 | 12/1989 | Gopal et al. | 379/221 |
| 5,311,583 | 5/1994 | Friedes et al. | 379/209 |
| 5,329,578 | * 7/1994 | Brennan et al. | 379/211 |
| 5,570,411 | 10/1996 | Sicher | 455/450 |
| 5,787,162 | * 7/1998 | Javitt | 379/229 |
| 5,802,155 | * 9/1998 | Garland et al. | 379/207 |
| 5,812,656 | * 9/1998 | Garland et al. | 379/229 |
| 5,828,742 | * 10/1998 | Khalid et al. | 379/201 |
| 5,857,018 | * 1/1999 | Sumner et al. | 379/266 |
| 5,946,388 | * 8/1999 | Walker et al. | 379/266 |

* cited by examiner

Primary Examiner—Harry S. Hong

(57) ABSTRACT

A method and a system for setting a priority level of a call in which a request is received for changing a priority level of a call to one of a plurality of available call priority levels, the priority level of the call is changed based on the received request, and the call is handled based on the changed priority level of the call. The request for changing the priority level of the call can be a request for a central office service feature for changing the priority of the call, receipt a call routed to a predetermined telephone number, such as an 800, an 888, a 900 or a charge-to-caller number, or receipt of a DTMF signal indicating the requested priority level. A message can be generated providing a menu for changing the priority level of the call having at least one available priority level with an associated charge rate for each available priority level. When the priority level of the call is changed, the call can be advanced in a call holding queue, a lower priority call can be interrupted or the call can be routed on a high-priority trunk capacity available for high-priority calls.

40 Claims, 3 Drawing Sheets

PRIORITY CALL ON BUSY

BACKGROUND OF THE INVENTION

1. Field of the Invention

The present invention relates to the field of telecommunications. More particularly, the present invention relates to a method and a system for setting a priority level of a call.

2. Description of the Related Art

FIG. 1 is a schematic block diagram of a conventional telecommunications system 10 that includes terminal equipment 11 and 16, a central offices 12 and 15, toll switches 13 and 14, and a call status platform 18. Terminal equipment 11, such as a standard wired-line telephone, wireless telephone, a computer terminal or a facsimile machine, is connected to a central office 12 of a Local Exchange Carrier (LEC) over link 17a in a well-known manner. Central office 12 is connected to long distance toll switch 13, such as a 4ESS™ type tandem switch, over trunk 17b in a well-known manner. Toll switch 13 is connected to toll switch 14, which can also be a 4ESS™ type tandem switch, over trunk 17c in a well-known manner. Toll switch 14 is connected to a central office 15 of another LEC over trunk 17d, which, in turn, is connected to terminal equipment 16, such as a standard wired-line telephone, a wireless telephone, a computer terminal or a facsimile machine. Call status platform 18 is connected to CO 12 and provides an audible indication of the status of a dialed call to a caller in a well-known manner, such as a ringing signal or a busy signal, depending upon the conditions encountered by the dialed call.

Even though only two toll switches are shown, the system of FIG. 1 can include more than two toll switches. A plurality of call status platforms 18 can be connected throughout telecommunications system 10, in which case, a call status platform local to where a busy connection is encountered signals a busy indication signal in a well-known manner to a call status platform that is local to the call originating equipment. Additionally, while system 10 is shown configured for completing interLATA telephone calls, system 10 can be configured for completing intraLATA telephone calls.

A call from terminal equipment 11 to terminal equipment 16 is connected in a well-known manner to central office (CO) 12. Central office 12 connects the call to toll switch 13. Under normal conditions, the call is routed to toll switch 14 over trunk 17c, then to CO 15 over trunk 17d, and finally to terminal equipment 16 over link 17e. In the situation when any of trunks 17b, 17c, 17d and 17e are filled to capacity with other call traffic, that is, busy, terminal equipment 11 will receive an indication that the call cannot be completed because the lines are busy. A caller in such a situation can either hang up and abandon efforts to complete the call, or continue to dial the desired number attempting to connect to terminal equipment 16.

While the concept of a call priority level has been used for traffic management and provisioning, what is needed, nevertheless, is a way for a caller to change a priority level of a call at the caller's option so that the call will be handled on a higher priority basis.

SUMMARY OF THE INVENTION

The present invention provides a method and a system that allows a caller to dynamically change the priority level of a call so that the call is handled on a higher priority basis. The advantages of the present invention are provided by a method and a system for setting a priority level of a call in which a request is received from an originator of a call for changing a priority level of a call to one of a plurality of available call priority levels, the priority level of the call is changed based on the received request, and the call is handled based on the changed priority level of the call. The request for changing the priority level of the call can be in response to a busy signal for the call, or be received from the originator of the call before the call is dialed. Further, the request for changing the priority level of the call can be a request for a central office service feature for changing the priority level of the call, receipt of a call routed to a predetermined telephone number, such as an 800, an 888, a 900 or a charge-to-caller number, or receipt of a DTMF signal indicating the requested priority level, and the requested priority level can be one of a plurality of available priority levels. A message can be generated providing a menu for changing the priority level of the call having at least one available priority level with an associated charge rate for each available priority level. When the priority level of the call is changed, the call can be advanced in a call holding queue, a lower priority call can be interrupted or the call can be routed on a high-priority trunk capacity available for high-priority calls.

BRIEF DESCRIPTION OF THE DRAWING

The present invention is illustrated by way of example and not limitation in the accompanying figures in which like reference numerals indicate similar elements and in which.

DETAILED DESCRIPTION

The present invention provides a method and a system that allows a caller to increase the priority level of a phone call so that a connection can be made over a busy trunk, or to a telephone number that is connected to a call center, such as a customer premises equipment (CPE) or a private branch exchange (PBX), that is overwhelmed with calls at the time the call is made. According to the invention, dynamic changing of the priority level of a call can be implemented by a touch-tone sequence that is entered after the desired telephone number is dialed, as a special 800, 888, 900 or other charge-to-caller number that is dialed prior to the telephone number that is being called, or as a central office (CO) feature that a caller can subscribe to.

Figure 1:
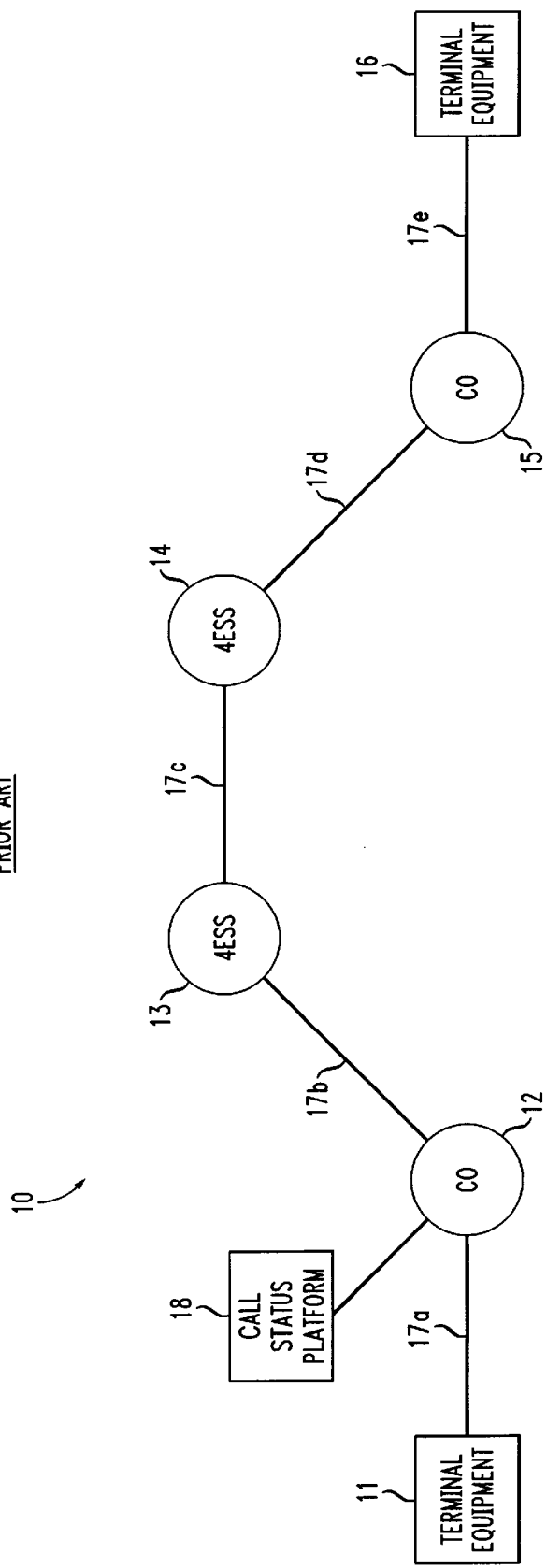
FIG. 1 is a schematic block diagram of a conventional telecommunications system.
Figure 2:
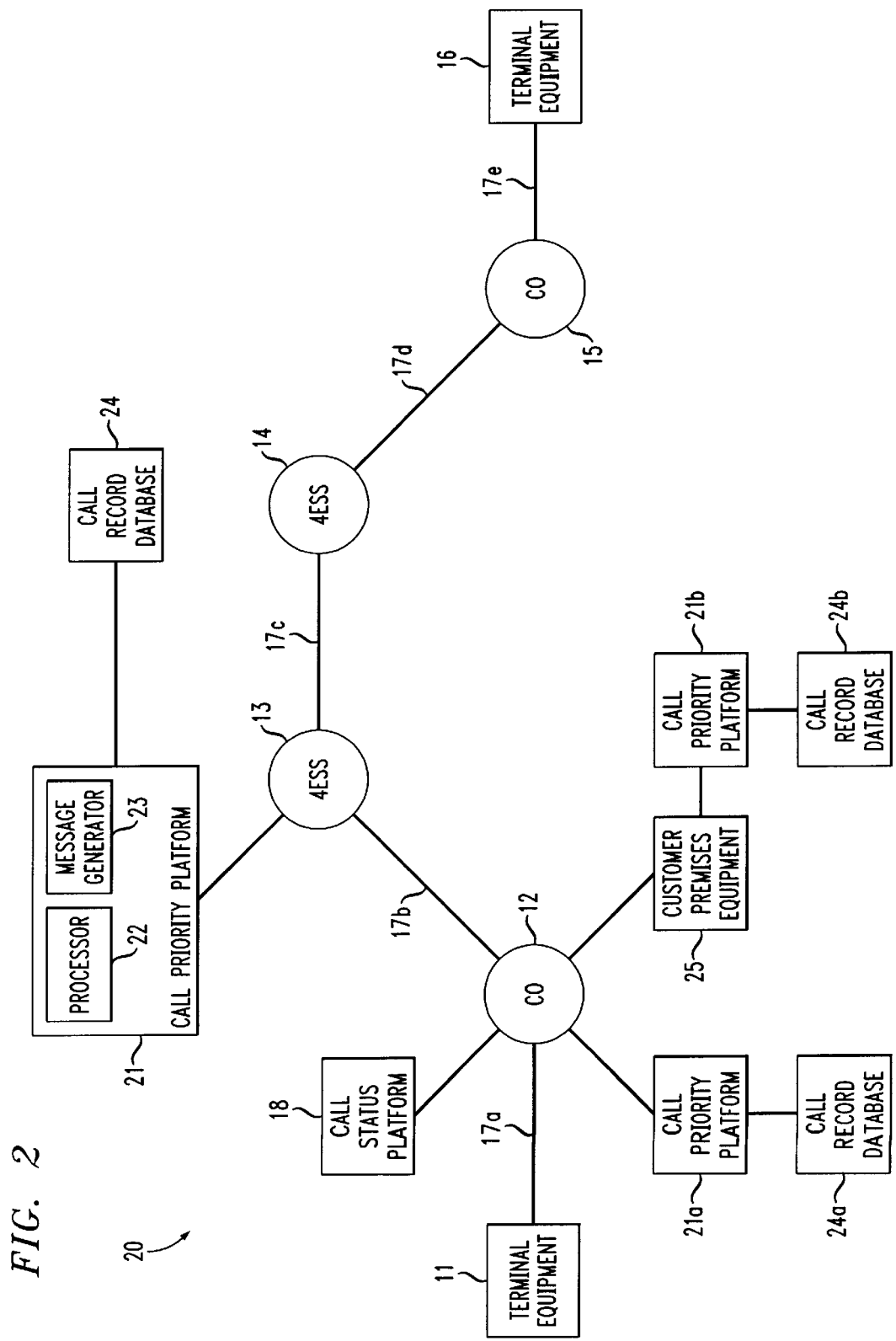
FIG. 2 is a schematic block diagram of a telecommunications system for dynamically changing a call priority level according to the present invention.

FIG. 2 is a schematic block diagram of a telecommunications system 20 for dynamically changing a call priority level according to the present invention. System 20 includes the components of conventional system 10, shown in FIG. 1, in addition to a call priority platform 21 connected to toll switch 13 that allows a caller to dynamically change the priority level of a call. While call priority platform 21 is shown connected to toll switch 13, a call priority platform can be connected to each toll switch of a telecommunications network. A plurality of call status platforms 18 can be connected throughout telecommunications system 20, in which case, a call status platform local to where a busy connection is encountered signals a busy indication signal in a well-known manner to a call status platform that is local to the call originating equipment. Additionally, while system 20 is shown configured for completing interLATA telephone calls, system 20 can be configured for completing intraLATA telephone calls.

Platform 21 includes a processor 22 and a message generator 23. When a call receives a trunk busy signal generated by call status platform 18, the call is intercepted by platform 21 and message generator 23 preferably plays a message in a well-known manner indicating that the caller can increase the priority level of the call by, for example, entering a particular touch-tone number or number sequence. Alternative ways for providing a caller a way for selecting a priority level for a call are for the caller to first dial a predetermined telephone number, such as an "800", "888" number or a "900" or other charge-to-caller number, before dialing the called number, or by activating a central office (CO) feature that a caller can subscribe to by dialing a special number sequence, such as *46, prior to dialing the called number. Yet another way for allowing a caller to optionally increase the priority level of the call is for the caller to enter a predetermined number sequence, such as *55, when a busy signal is heard by the caller, thereby automatically increasing the priority level of the call.

By increasing the priority level of the call, the call is handled on a high priority basis and routed to the called number accordingly. For example, trunk capacity can be provisioned to include high-priority slots that are used for handling a call having increased priority level so that a caller has instant access to the "busy" trunk. The high-priority capacity of a trunk can be conditionally allocated for carrying lower priority calls during low demand times for high-priority calls. A low priority caller is given a lower rate with the understanding that a low-priority call can be interrupted and dropped when a high priority call requests the capacity used by the low priority call. Low priority calls, for example, can be facsimile traffic or any other applications in which a machine automatically redials a call after the call is interrupted. Another example of a low priority call that can be conditionally allocated in a high-priority provision of a trunk is a credit card validation call. When a low-priority credit card machine call is interrupted, the machine can automatically redial at a normal, or even a higher priority level.

An alternative way to handle a high-priority call is to interrupt a lower-priority call provisioned in the general capacity of a trunk, and to use the newly available trunk capacity for handling the high-priority call. Another alternative for handling a high-priority call is for the call to be advanced to the front of a call holding queue in which calls are waiting for the next available trunk line. The caller can then be informed of where the call was placed in the call holding queue. Alternatively, no indication is provided of the relative placement in the call holding queue. While either of these alternative call handling approaches do not provide instant access to the dialed number, the caller has the benefit of receiving the next available slot in the trunk.

Yet another alternative for handling a high-priority call is to provide a caller with a choice to receive any of the above-mentioned priority call handling methods, with each handling technique having a different charge rate. For example, a caller can be informed that there are X number of calls ahead of the caller, and the caller can move up within the call holding queue at a first charge rate. For a higher price, the call can be handled by interrupting a lower priority call or be handled by using a slot in a high-priority provision of the trunk.

Once call priority platform 21 has changed the priority level of a call and handled the call according to the new priority level, platform 21 sends a message to a call record database 24 in a well-known manner so that the call will be billed accordingly.

A call priority platform can also be connected to a central office (CO) 12, such as platform 21a shown in FIG. 2, for handling calls to CPE 25. Alternatively, CPE 25 can be replaced by a PBX. In this configuration, platform 21a is part of CO 12 and is controlled by CO 12. When a caller calling CPE 25 encounters a busy signal, whether the call originates from terminal equipment 11 or 16, platform 21a provides the caller with an opportunity for increasing the priority level of the call for gaining priority access to CPE 25. For example, if CPE 25 includes a ticket sales telephone number, platform 21a provides priority access to the ticket sales line for callers wishing to purchase tickets to a concert or sporting event and who are will to pay a premium for receiving a priority access to the ticket sales line. After call priority platform 21a has changed the priority level of the call, platform 21a sends a message to a call record database 24a in a well-known manner so that the call will be billed by CO 12 accordingly.

Alternatively, a call priority platform can also be connected to CPE 25, as shown by platform 21b in FIG. 2. In this configuration, call priority platform 21b is under control of CPE 25. Callers calling CPE 25 are given the opportunity to increase the priority level of a busy call for gaining priority access to, for example, a ticket sales line that is part of CPE 25. After call priority platform 21b has changed the priority level of a call, platform 21b sends a message to a call record database 24b in a well-known manner so that the call will be billed by CPE 25 accordingly. The premium charge associated with increasing the priority level of a call can be included in the price of the item or services purchased from the sales line. Similarly, the present invention can be used for providing preferred access to a contest telephone or for telephone access to a celebrity. Platform 21b can offer a recording of a conversation with the celebrity for a yet higher price.

Figure 3:
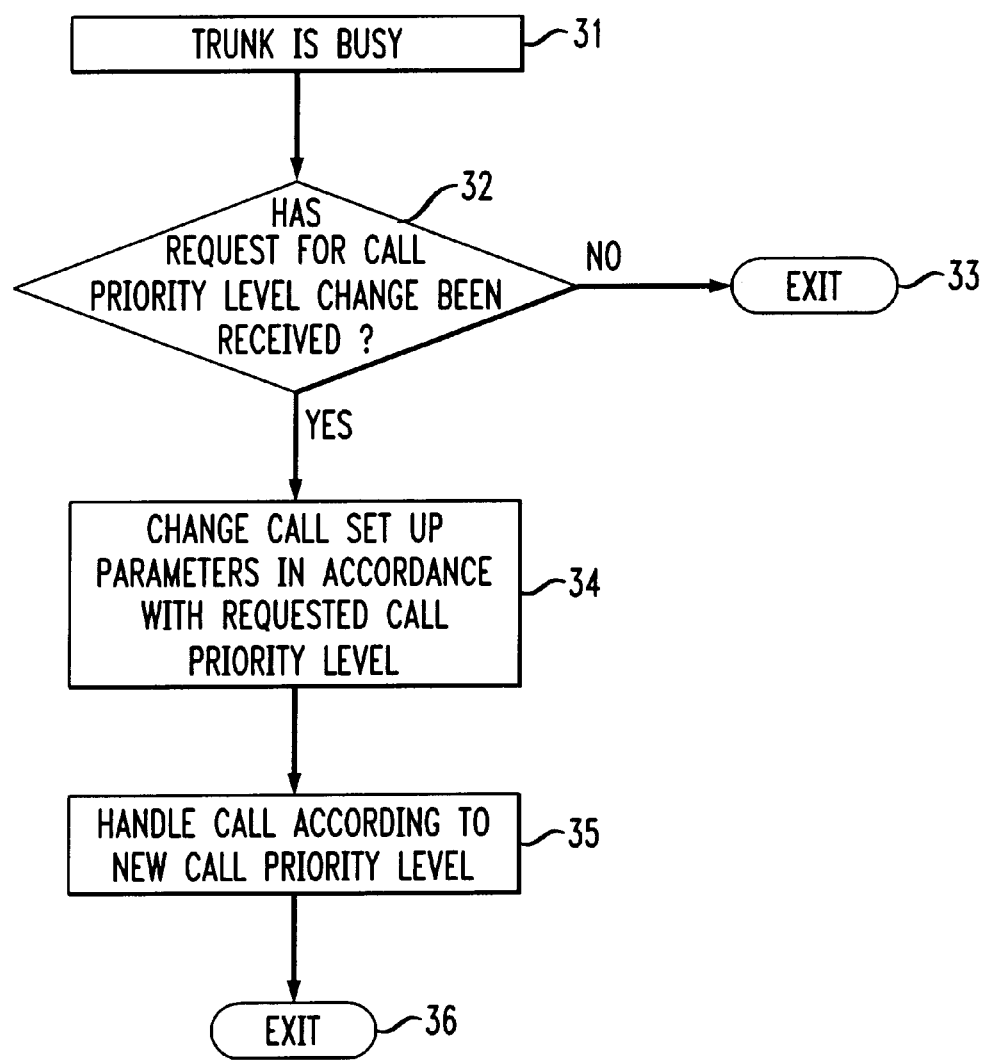
FIG. 3 is a flow diagram of a process for providing dynamically changing a call priority level according to the present invention.

FIG. 3 is a flow diagram of a process for dynamically changing a call priority level according to the present invention. At step 31, a caller receives a trunk busy indication or a busy signal, and hears a recorded message providing the caller with the option to change the priority level of the call. Alternatively, the caller receives a busy signal and no recorded message is provided because the caller has a priori knowledge that the telecommunications network offers the option of dynamically changing the priority level of a call. At this point, the caller can choose to increase the priority level of the call by entering a particular touch-tone number, for example. Call priority platform can also be configured for recognizing a spoken command in a well-known manner that requests a change in call priority level. At step 32, it is determined whether a request for a call priority level change for the call has been changed. If a priority level change request has not changed, flow continues to step 33 where call priority level handling is exited. If a priority level change request of the call has been received at step 32, flow continues to steps 34 where the call priority level in the call set up parameters is changed accordingly.

Alternatively, the caller can terminate the call at step 31 and dial a predetermined number first, such as an "800", an "888" number, a "900" or other charge-to-caller number, to gain access to a call priority platform according to the present invention. When the present invention is embodied using a predetermined telephone number, such as an 800, an 888, a 900 or other charge-to-caller number, that is called prior to dialing the desired number, a caller can, of course, dial the predetermined number to receive high-priority call handling without first learning that a trunk connection is busy. Similarly, a call priority service that is a CO feature and which is subscribed to by the caller can be activated by dialing a special number sequence prior to dialing a desired number. In either alternative embodiment, a message can be played for the caller providing a menu of options for selecting a desired call priority level, or the change in priority level is automatic and the caller hears a message or audible tone providing a notification of the automatic priority level change. Alternatively, no notification message or indication need be provided to the caller because the change in call priority level is automatic. Accordingly, the flow diagram is entered at step 34 for all of these alternative embodiments.

At step 35, the call is handled according to the new call priority level. For example, the call can be routed to the destination number in a slot of a high-priority provision of the trunk, in a slot made available by interrupting a lower priority call in the general provision of the trunk, or by advancing the call in a call holding queue so that the next available slot of the trunk is made available to the call. High-priority call handling is exited at step 36 once the call has been routed appropriately.

Even though the present invention has been described in terms of a caller requesting a higher call priority level, the present invention can also be used for requesting a lower priority level, thus providing the caller with a less expensive call, such as for a facsimile transmission that can be redialed automatically should the call be interrupted. Additionally, a caller can be given the option of selection from several different call priority levels.

While the present invention has been described in connection with the illustrated embodiments, it will be appreciated and understood that modifications may be made without departing from the true spirit and scope of the invention.

What is claimed is:

1. A method for setting a priority level of a call, the method comprising the steps of:
   receiving a request for changing a priority level of a call from an originator of the call without first learning that a trunk connection may be busy;
   changing the priority level of the call based on the received request; and
   handling the call based on the changed priority level of the call, wherein the step of changing the priority level of the call includes the step of advancing the call in a call holding queue.

2. The method according to claim 1, wherein the step of advancing the call advances the call to a beginning of the call holding queue.

3. A method for setting a priority level of a call, the method comprising the steps of:
   receiving a request for changing a priority level of a call from an originator of the call without first learning that a trunk connection may be busy;
   changing the priority level of the call based on the received request; and
   handling the call based on the changed priority level of the call, wherein the step of receiving the request includes the step of generating a message indicating to the originator of the call a menu of selectable priority levels available for changing the priority level of the call and a charge rate associated with each available priority level.

4. A method for setting a priority level of a call, the method comprising the steps of:
   receiving a request for changing a priority level of a call from an originator of the call;
   changing the priority level of the call based on the received request; and
   handling the call based on the changed priority level of the call;
   wherein the priority level for the call is set by the originator of the call before the call is dialed.

5. The method according to claim 1, wherein the step of receiving the request for changing the priority level of the call includes the step of receiving a request for a central office service feature for changing the priority level of the call.

6. The method according to claim 1, wherein the step of receiving the request for changing the priority level of the call includes the step of receiving a call routed to a predetermined telephone number.

7. The method according to claim 6, wherein the predetermined telephone number is one of an 800 telephone number and an 888 telephone number.

8. The method according to claim 6, wherein the predetermined telephone number is one of a 900 telephone number and a charge-to-caller number.

9. The method according to claim 1, wherein the step of receiving the request for changing the priority level of the call includes the step of receiving a DTMF signal indicating the requested priority level.

10. The method according to claim 9, wherein the requested priority level is one of more than two available priority levels.

11. The method according to claim 1, wherein the step of receiving the request for changing the priority level of the call includes the step of recognizing a spoken command indicating the requested priority level.

12. The method according to claim 11, wherein the requested priority level is one of more than two available priority levels.

13. The method according to claim 1, wherein the requested priority level is one of more than two available priority levels.

14. The method according to claim 1, wherein the step of changing the priority level of the call includes the step of advancing the call in a call holding queue.

15. The method according to claim 14, wherein the step of advancing the call advances the call to a beginning of the call holding queue.

16. The method according to claim 1, wherein the step of changing the priority level of the call includes the steps of:
   interrupting a call having a call priority level that is lower than the changed priority level of the call, and
   making a trunk capacity used by the interrupted call available for handling the call.

17. The method according to claim 16, wherein the step of handling the call based on the changed priority level of the call includes the step of routing the call on the trunk capacity made available for handling the call.

18. The method according to claim 1, wherein the step of changing the priority level of the call includes the step of making a high-priority capacity of a trunk available for handling the call.

19. The method according to claim 1, wherein the step of receiving the request for changing a priority level of a call includes the step of generating a message indicating to a caller of the call a menu for changing the priority level of the call.

20. The method according to claim 19, wherein the step of generating the message includes the step of indicating at least one available priority level of the call, each available priority level being selectable by the caller.

21. The method according to claim 20, wherein the step of indicating at least one available priority level includes the step of indicating a charge rate associated with each available priority level.

22. A system for setting a priority level of a call, comprising:
- a call status indication generator generating an indication signal related to a status of a call for a dialed number; and
- a processor receiving a request for a selected priority level from a caller of the call before the call is dialed and being responsive to the received request by changing a priority level of the call based on the received request, and handling the call based on the changed priority level of the call.

23. The system according to claim 22, wherein the received selected priority level is a request for a central office service feature for changing the priority level of the call.

24. The system according to claim 22, wherein the received selected priority level is based on receiving a call routed to a predetermined telephone number.

25. The system according to claim 24, wherein the predetermined telephone number is one of an 800 telephone number and an 888 number.

26. The system according to claim 24, wherein the predetermined telephone number is one of a 900 telephone number and a charge-to-caller number.

27. The system according to claim 24, further comprising a message generator responsive to the indication signal by generating an audible indication that at least one call priority level for the call can be selected.

28. The system according to claim 27, wherein the audible indication is a message indicating to a caller of the call a menu for changing the priority level of the call.

29. The system according to claim 28, wherein the message includes at least one available priority level of the call, each available priority level being selectable by the caller.

30. The system according to claim 29, wherein the message indicates a charge rate associated with each available priority level.

31. The system according to claim 22, wherein the received selected priority level is a DTMF signal indicating the requested priority level.

32. The system according to claim 31, wherein the requested priority level is one of more than two available priority levels.

33. The system according to claim 22, wherein the requested priority level is a spoken command indicating the requested priority level that is recognized by the processor.

34. The system according to claim 33, wherein the requested priority level is one of more than two available priority levels.

35. The system according to claim 22, wherein the requested priority level is one of more than two available priority levels.

36. The system according to claim 22, wherein when the processor changes the priority level of the call, the call is advanced in a call holding queue.

37. The system according to claim 36, wherein the call is advanced to a beginning of the call holding queue.

38. The system according to claim 22, wherein when the processor handles the call, the processor interrupts a call having a call priority level that is lower than the changed priority level of the call, and makes a trunk capacity used by the interrupted call available for handling the call.

39. The system according to claim 38, wherein the processor handles the call by routing the call on the trunk capacity made available for handling the call.

40. The system according to claim 22, wherein when the processor changes the priority level of the call, the processor makes a high-priority capacity of a trunk available for handling the call.

* * * * *